US006463154B1

United States Patent
Patel

(10) Patent No.: US 6,463,154 B1
(45) Date of Patent: Oct. 8, 2002

(54) METHOD FOR DETERMINING TEMPORARY MOBILE IDENTIFIERS AND MANAGING USE THEREOF

(75) Inventor: Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/141,581

(22) Filed: Aug. 28, 1998

(51) Int. Cl.$^7$ ................................................ H04K 1/00
(52) U.S. Cl. ....................... 380/270; 380/247; 455/526; 455/433; 455/432
(58) Field of Search ................................ 380/247, 270; 455/526, 433, 432

(56) References Cited

U.S. PATENT DOCUMENTS

| 4,315,101 A | * | 2/1982 | Atalla ..................... 178/22.08 |
| 5,153,919 A | | 10/1992 | Reeds, III et al. |
| 5,375,251 A | * | 12/1994 | Pfundstein .................... 455/33 |
| 5,761,618 A | | 6/1998 | Lynch et al. |

FOREIGN PATENT DOCUMENTS

| EP | 0447380 | 9/1991 |
| EP | 0978958 | 2/2000 |
| WO | 9826538 | 6/1998 |
| WO | 9848528 | 10/1998 |

OTHER PUBLICATIONS

Park, Chang–Seop, On Certificate–Based Security Protocols for Wireless Mobile Communication Systems, IEEE Network, IEEE Inc., New York, U.S., vol. 11, NR. 5, pp. 50–55, XP000699941.

Campanini G. et al., "Privacy, Securiy and User Identification in New Generation Radiomobile Systems", International Conference on Digital Land Mobile Radio Communications, pp. 152–164.

M. Bellare and P. Rogaway, Entity authentication and key distribution, *Advances in Cryptology—Crypto*, 1993.

S. Bellovin and M. Merritt, Encrypted key exchange: password–based protocols secure against dictionary attacks, *IEEE computer society symposium on research in security and privacy*, 72–84 May 1992.

R. Bird, I. Gopal, A. Herzberg, P. Janson, S. Kutten, R. Molva, and M. Yung, Systematic design of two–party authentication protocols, *Advances in Cryptology—Crypto*, 1991.

(List continued on next page.)

Primary Examiner—Gail Hayes
Assistant Examiner—James Seal
(74) Attorney, Agent, or Firm—Harness, Dickey & Pierce, P.L.C.

(57) ABSTRACT

In the method for managing the use of temporary mobile identifiers (TIDs), the mobile and the network each store a list of TIDs for the mobile. Newly determined TIDs are added to the respective TID list such that the TIDs are stored in chronological order. To determine a new TID, the network sends a first challenge to the mobile and the mobile sends a second challenge to the network as part of a TID update protocol. The network and the mobile then determine the new TID based on the first and second challenges. As communication between the mobile and the network continues, the respective TID lists are updated. Namely, when either the network or the mobile confirms a TID, the TIDs older than the confirmed TID are deleted from the TID list. In communicating with one another, the mobile will use the oldest TID on its TID list, while the network will use the newest TID on its TID list.

26 Claims, 2 Drawing Sheets

OTHER PUBLICATIONS

M. Blum and S. Micali, How to generate cryptographically strong sequences of pseudo random bits, *SIAM J. Computing*, 13 No. 4:850–864, 1984.

R. B. Boppana and R. Hirschfeld, Pseudorrandom generators and complexity classes, *Advances in Computing Research*, 5 (S. Micali, Ed.), JAI Press, CT.

U.S. Department of Commerce/N.I.S.T., *Digital Signature Standard*, FIPS 186, May 1994.

O. Goldreich and L.A. Levin, A hard–core predicate for all one way functions, *Proceedings of $21^{st}$ STOC*, 25–32, 1989.

S. Goldwasser and A. Micali, Probabilistic encryption, *Journal of Computer and Systems Science*, 28: 270–299, 1984.

L. Gong, T. Lomas, R. Needham and J. Saltzer, Protecting poorly chosen secrets from guessing attacks, *IEEE Journal on Selected Areas in Communications*, 11(5): 648–656, Jun. 1993.

T. Lomas, L. Gong, J. Saltzer and R. Needham, Reducing Risks from Poorly Chosen Keys, *Proceedings of the $12^{th}$ ACM Symposium on Operating System Principles, ACM Operating Systems Review*, 23(5): 14–18, Dec. 1989.

S. Patel, Information Leakage in Encrypted Key Exchange, *Proceedings of DIMACS workshop on Network Threats*, 38: 33–40, Dec. 1996.

S. Patel, Number theoretic attacks on secure password schemes, *IEEE symposium on security and privacy*, 236–247, May 1997.

S. Patel, Weaknesses of the north american wireless authentication protocol, *IEEE Personal Communications*, 40–44, Jun. 1997.

M. Beller, L. Chang and Y. Yacobi, Privacy and authentication on a portable communication system, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless systems, *IEEE symposium on security and privacy*, May 1998.

TIA/EIA Interim Standard, *Over–the Air Service Provisioning of Mobile Stations in Spread Spectrum Systems*, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Cryptology—Crypto*, 1984.

D. Jablon, Strong Password–Only Authenticated Key Exchange, *ACM SIG–COMM Computer Communications Review*, Oct. 1996.

A. C. Yao, Theory and applications of trapdoor functions, *Proceedings of $23^{rd}$ FOCS*, 80–91, 1982.

S. Lucks, Open Key Exchange: How to defeat dictionary attacks without encrypting public keys, Proceedings of the Security Protocol Workshop '97, 1997.*

Oded Goldreich, Shafi Goldwasser, Silvio Micali, How to Construct Random Functions, Journal of the Association for Computing Machinery, vol. 33, No. 4, pp. 792–807, Oct. 1986.*

* cited by examiner

METHOD FOR DETERMINING TEMPORARY MOBILE IDENTIFIERS AND MANAGING USE THEREOF

RELATED APPLICATIONS

The following applications, filed on Jul. 31, 1998, are related to the subject application and are hereby incorporated by reference in their entirety: application Ser. No. 09/127,767 entitled METHOD FOR TWO PARTY AUTHENTICATION AND KEY AGREEMENT by the inventor of the subject application, application Ser. No. 09/127,768, now Pat. No. 6,243,811 entitled METHOD FOR UPDATING SECRET SHARED DATA IN A WIRELESS COMMUNICATION SYSTEM by the inventor of the subject application; application Ser. No. 09/127,766, now U.S. Pat. No. 6,249,867 entitled METHOD FOR TRANSFERRING SENSITIVE INFORMATION USING INTIALLY UNSECURED COMMUNICATION by the inventor of the subject application; application Ser. No. 09/127,045 entitled METHOD FOR SECURING OVER-THE-AIR COMMUNICATION IN A WIRELESS SYSTEM by the inventor of the subject application; and application Ser. No. 09/127,769, now U.S. Pat. No. 6,192,474 entitled METHOD FOR ESTABLISHING A KEY USING OVER-THE-AIR COMMUNICATION AND PASSWORD PROTOCOL AND PASSWORD PROTOCOL by the inventor of the subject application and Adam Berenzweig.

The following applications, filed concurrently with the subject application, are related to the subject application and are hereby incorporated by reference in their entirety: application Ser. No. 09/141,582 entitled METHOD FOR PROTECTING MOBILE ANONYMITY by the inventor of the subject application and application Ser. No. 09/141,580 entitled METHOD FOR ESTABLISHING SESSION KEY AGREEMENT by the inventor of the subject application.

BACKGROUND OF THE INVENTION

1. Field of the Invention

The present invention relates to a method for determining temporary mobile identifiers and managing the use thereof in a wireless system.

2. Description of Related Art

The U.S. currently utilizes three major wireless systems, with differing standards. The first system is a time division multiple access system (TDMA) and is governed by IS-136, the second system is a code division multiple access (CDMA) system governed by IS-95, and the third is the Advanced Mobile Phone System (AMPS). All three communication systems use the IS-41 standard for intersystem messaging, which defines the authentication procedure for call origination, updating the secret shared data, and etc.

FIG. 1 illustrates a wireless system including an authentication center (AC) and a home location register (HLR) 10, a visiting location register (VLR) 15, and a mobile 20. While more than one HLR may be associated with an AC, currently a one-to-one correspondence exists. Consequently, FIG. 1 illustrates the HLR and AC as a single entity, even though they are separate. Furthermore, for simplicity, the remainder of the specification will refer to the HLR and AC jointly as the AC/HLR. Also, the VLR sends information to one of a plurality of mobile switching centers (MSCs) associated therewith, and each MSC sends the information to one of a plurality of base stations (BSs) for transmission to the mobile. For simplicity, the VLR, MSCs and BSs will be referred to and illustrated as a VLR. Collectively, the ACs, HLRs, VLRs, MSCs, and BSs operated by a network provider are referred to as a network.

A root key, known as the A-key, is stored only in the AC/HLR 10 and the mobile 20. There is a secondary key, known as Shared Secret Data SSD, which is sent to the VLR 15 as the mobile roams (i.e., when the mobile is outside its home coverage area). The SSD is generated from the A-key and a random seed RANDSSD using a cryptographic algorithm or function. A cryptographic function is a function which generates an output having a predetermined number of bits based on a range of possible inputs. A keyed cryptographic function (KCF) is a type of cryptographic function that operates based on a key; for instance, a cryptographic function which operates on two or more arguments (i.e., inputs) wherein one of the arguments is the key. From the output and knowledge of the KCF in use, the inputs can not be determined unless the key is known. Encryption/decryption algorithms are types of cryptographic functions. So are one-way functions like pseudo random functions (PRFs) and message authentication codes (MACs). The expression $KCF_{SK}(R_N')$ represents the KCF of the random number $R_N'$ using the session key SK as the key. A session key is a key that lasts for a session, and a session is a period of time such as the length of a call. In the IS-41 protocol, the cryptographic function used is CAVE (Cellular Authentication and Voice Encryption).

During procedures such as call origination, registration, updating secret shared data, etc. user identity information is transferred from the mobile to the network as part of the communication. User identity information includes, for example, mobile identification numbers (MIN) and/or electronic serial numbers (ESN). For the purposes of discussion, the term permanent ID will be used to cover one or more elements of mobile identity information. However, using the permanent ID allows an attacker to identify and track a mobile; and thus a mobile user. Many mobile users consider this lack of privacy undesirable.

One technique for maintaining mobile anonymity and protecting privacy involves the use of aliases or temporary IDs (TIDs). Once in place, communication takes place using the TID. However, simple uses of anonymity tend to be ineffective in that they permit an attacker to simulate conditions under which the mobile will reveal its true or permanent ID.

Typically, attacks involve blocking part of the communication between a mobile and the network such that the mobile does not confirm an updated TID and resorts to the previous TID while the network has already updated the TID. With out-of-synch updates, the network does not recognize the mobile, and, in order to re-establish communication, the mobile uses its permanent ID.

SUMMARY OF THE INVENTION

In the method for determining and managing use of temporary mobile identifiers, the network sends a first challenge to the mobile and the mobile response with a first challenge response and a second challenge. Based on the first and second challenges, the mobile and the network respectively generate a new TID. The network and the mobile keep respective TID lists for the mobile, and store the new TID on their respective lists. The TIDs on both lists are stored in chronological order.

As communication between the mobile and the network proceeds, the mobile will confirm a TID on the list based on that communication. When a TID is confirmed, the mobile deletes TIDs older than the confirmed TID from its TID list.

Similarly, when the network receives a communication from the mobile including a TID, the network confirms the TID and deletes TIDs older than the confirmed TID from its TID list. During communication with each other, the mobile will use the oldest TID on its TID list, while the network will use the newest TID on its TID list.

By managing the use of TIDs in this fashion, the mobile does not need to reveal its permanent ID even if an out-of-synch condition results. Through the use and management of TID lists, communication between the network and the mobile continues through the use of older TIDs, and the TID lists kept by both the mobile and the network are updated as the TIDs in use are confirmed.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
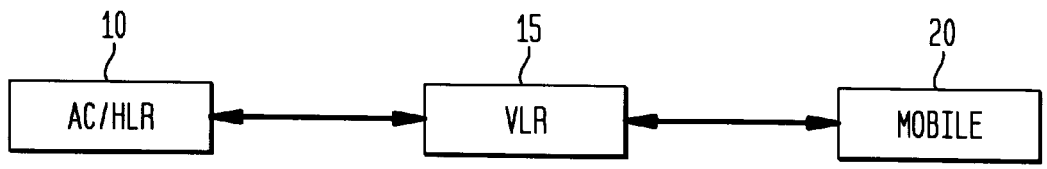
FIG. 1 illustrates a conventional wireless system.

The method of managing the use of temporary mobile identifiers (TIDs) according to the present invention will be described with reference to the wireless system of FIG. 1. In the method according to the present invention, the mobile 20 and the network respectively maintain and manage a list of TIDs for the mobile 20. Based on the respective lists, and the management thereof, new TIDs are established and out-of-synch attacks are prevented.

Furthermore, in the method according to the present invention, besides the A-key, both the AC/HLR 10 and the mobile 20 prestore an M-key and a T-key generated based on the A-key. The M-key and T-key are generated by applying a pseudo random function (PRF) indexed by the A-key on a value known to the network and the mobile 20. A practical PRF is the well-known Data Encryption Standard-Cipher Block Chaining (DES-CBC) algorithm from NIST (National Institute of Standards). In a preferred embodiment, DES-CBC, indexed by the 64-bit A-key on a first known value, produces a 64-bit M-key, and DES-CBC, indexed by the 64-bit A-key on a second known value, produces a 64-bit T-Key.

Figure 2:
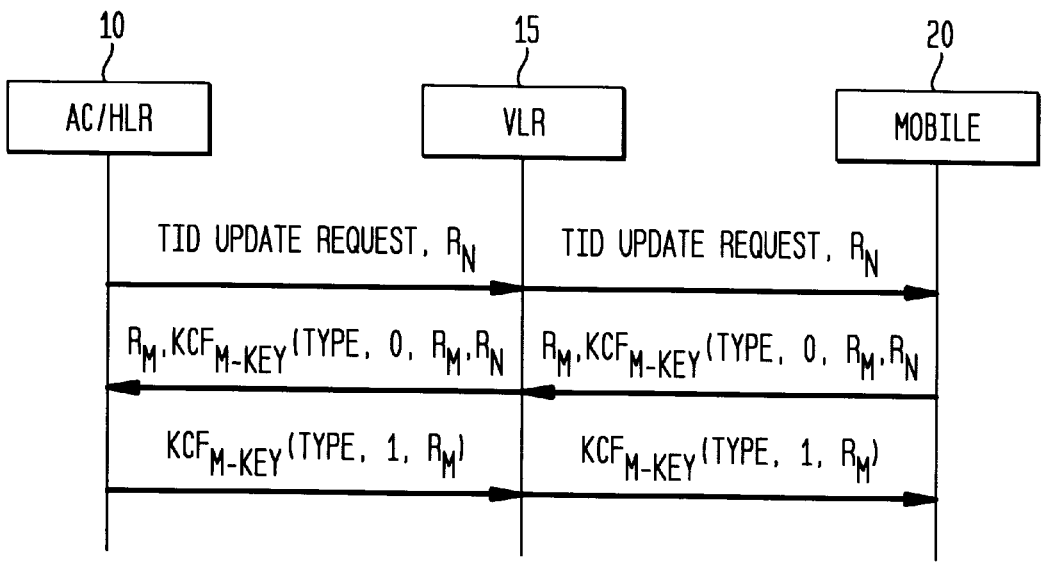
FIG. 2 illustrates the communication between the mobile and the network to establish a new TID.

The method of managing the use of TIDs according to an embodiment of the present invention will be described with respect to FIGS. 2–4.

When the mobile 20 first attempts a system access in an area covered by the VLR 15, such as registration, the mobile 20 transmits a TID and an identifier for the AC/HLR associated with the mobile 20 as part of the communication. Using this AC/HLR identifier, the VLR 15 communicates with the AC/HLR 10 to obtain verification of the TID used by the mobile 20, and if verified, to obtain a TID list kept by the AC/HLR 10 for the mobile 20.

Alternatively, the mobile 20 identifies the previous VLR in communication with the mobile 20, and the VLR 15 obtains verification of the TID and the TID list for the mobile 20 from the previous VLR.

Periodically, the AC/HLR 10 updates the TID for the mobiles associates therewith. In a preferred embodiment, the TID is established using the protocol shown in FIG. 2. FIG. 2 illustrates the communication between the mobile 20 and the network (i.e., AC/HLR 10 and VLR 15) to establish a new TID. As shown in FIG. 2, in the first round of communication, the AC/HLR 10 sends a TID update request and a random number $R_N$, generated using a random number generator, to the mobile 20 via the VLR 15. The random number $R_N$ serves as a challenge.

In response to the TID update request, the mobile 20 generates a random number $R_M$ as a challenge using a random number generator. The mobile then calculates the new TID as $PRF_{T\text{-}Key}(R_M, R_N)$, wherein the PRF is preferably DES-CBC, and adds the new TID to the end of the TID list kept at the mobile 20. In this manner, the newest TID is added to the end of the TID list so that the mobile 20 chronologically stores the TIDs in the TID list. Instead of storing the newest TIDs at the end of the TID list, the newest TIDs can be added to the beginning of the TID list.

Next, the mobile 20 performs a keyed cryptographic algorithm or function (KCF) on the random numbers $R_N$ and $R_M$, Type data, and id data 0 using an M-key as the key to obtain a challenge response. This calculation is represented as $KCF_{M\text{-}Key}(\text{Type}, 0, R_M, R_N)$. Preferably, the KCF is a keyed message authentication code such as HMAC, but could be a PRF such as DES-CBC. The Type data represents the type of protocol being performed; namely, the TID update protocol. Other protocol types include call origination, call termination, and mobile registration. The id data 0 indicates that the communication issued from the mobile. Id data 1, by contrast, indicates that the communication is from the network. The mobile 20 then sends the random number $R_M$ and the challenge response of $KCF_{M\text{-}Key}(\text{Type}, 0, R_M, R_N)$ to the AC/HLR 10 via the VLR 15.

Because the AC/HLR 10 initiated the TID update protocol with the TID update request, the AC/HLR 10 knows the Type data, and because communication from mobiles include the same id data of 0, this value is known as well. Accordingly, upon receipt of $R_M$, the VLR 15 calculates $KCF_{M\text{-}Key}(\text{Type}, 0, R_M, R_N)$. The AC/HLR 10 then verifies whether the calculated version of $KCF_{M\text{-}Key}(\text{Type}, 0, R_M, R_N)$ matches the version received from the mobile 20. If a match is found, the VLR 15 authenticates the mobile 20, calculates the new TID as $PRF_{T\text{-}Key}(R_M, R_N)$, wherein the PRF is preferably DES-CBC, and adds the new TID to the end of the TID list kept at the AC/HLR 10 for the mobile 20. In this manner, the newest TID is added to the end of the TID list so that the AC/HLR 10 chronologically stores the TIDs in the TID list. Instead of storing the newest TIDs at the end of the TID list, the newest TIDs can be added to the beginning of the TID list.

Next, the AC/HLR 10 calculates $KCF_{M\text{-}Key}(\text{Type}, 1, R_M)$ as a challenge response, where 1 is the id data of the network, and sends the calculated result to the mobile 20. The mobile 20 knows the Type data from the TID update request, and knows that communication from the network includes id data of 1. Accordingly, the mobile 20 calculates $KCF_{M\text{-}Key}(\text{Type}, 1, R_M)$. The mobile 20 then verifies whether the calculated version of $KCF_{M\text{-}Key}(\text{Type}, 1, R_M)$ matches the version received from the AC/HLR 10. If a match is found, the mobile 20 authenticates the network and confirms the new TID.

Figure 3:
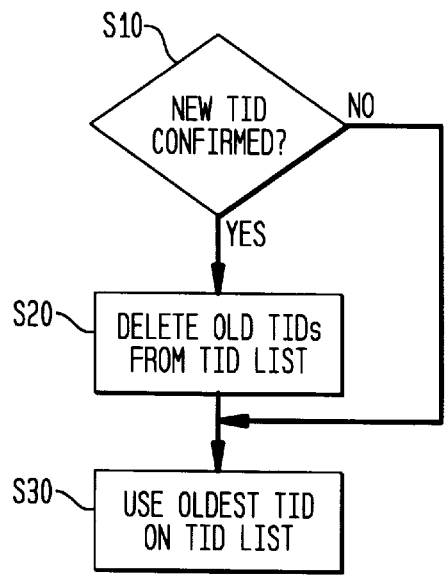
FIG. 3 illustrates a flow chart of TID management performed by the mobile according to an embodiment of the present invention.
Figure 4:
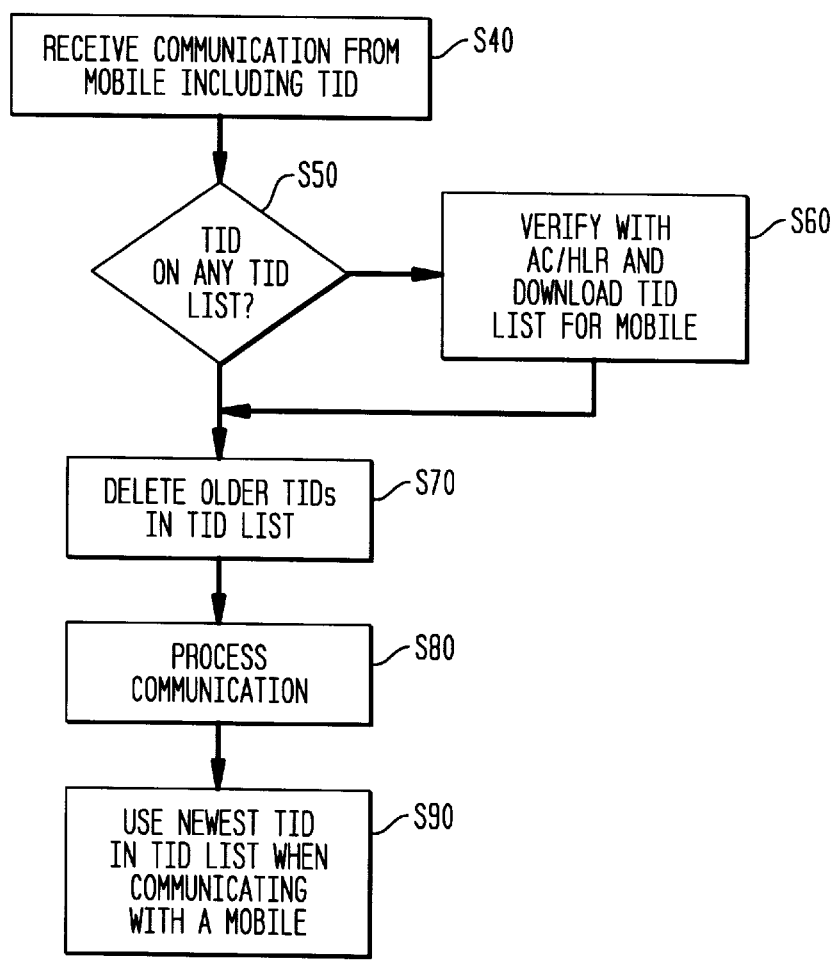
FIG. 4 illustrates a flow chart of TID management performed by the network according to an embodiment of the present invention.

FIG. 3 illustrates a flow chart of TID management performed by the mobile 20 according to an embodiment of the present invention. As shown in FIG. 3, in step S10 the mobile 20 determines whether the a TID has been confirmed. Confirmation can occur in different ways. A new TID is confirmed if the mobile 20 verifies the network after receiving the challenge response of $KCF_{M\text{-}Key}(Type, 1, R_M)$ during the TID update protocol. The mobile 20 also confirms a TID if the mobile 20 receives a communication, such as a page, from the network using the TID. It should be noted that in this instance the confirmed TID is not necessarily the newest TID.

If the mobile 20 confirms a TID, then in step S20, the mobile 20 deletes all TIDs older than the confirmed TID from the mobile's TID list, and processing proceeds to step S30. If the mobile 20 does not confirm a TID, then processing proceeds to step S30 as well. In step S30, the mobile 20 uses the oldest TID on the TID list as the identity information for the mobile 20 in further communication with the network.

Next, the TID management performed by the VLR 15 will be described. FIG. 4 illustrates a flow chart of TID management performed by the VLR 15 according to an embodiment of the present invention. In the first step, step S40, the VLR 15 receives a communication from the mobile 20 including the TID for the mobile 20. Next, in step S50, the VLR 15 determines whether the received TID is on any of the TID lists kept by the VLR 15.

If not on any of the TID lists, the VLR 15 attempts to verify the TID of the mobile 20 through communication with the AC/HLR 10 as discussed above and to download the TID list for the mobile 20 from the AC/HLR 10. If TID of the mobile 20 is not verified by the AC/HLR 10, then the communication is discarded and processing ends. However, if received TID is verified and the TID list for the mobile is downloaded to the VLR 15, processing proceeds to step S70.

If the VLR 15 determines in step S50 that the received TID is on a TID list, then in step S70, the VLR 15 deletes all the TIDs in the TID list which are older than the received TID. The VLR 15 also sends update information to the AC/HLR 10 associated with the mobile 20 to update the TID list kept by the AC/HLR 10 for the mobile 20. Processing then proceeds to step S80 wherein the communication is processed.

Finally, as shown in step S90, when communicating with a mobile, the VLR 15 will use the newest (i.e., youngest) TID in the TID list for that mobile.

The method for managing the use of TIDs according to the present invention prevents attacks that cause the mobile to reveal its permanent ID. Through the use and management of TID lists, communication between the VLR 15 and the mobile 20 continues through the use of older TIDs, and the TID lists kept by both the mobile 20 and the VLR 15 are updated as the TIDs in use are confirmed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for managing use of a temporary mobile identifier (TID) at a mobile, comprising:
   a) storing at least one TID in a TID list;
   b) modifying said TID list based on information received from a network; and
   c) using a TID on said TID list in sending a transmission to said network.

2. The method of claim 1, wherein said step b) comprises:
   b1) confirming a TID on said TID list based on said information received from said network; and
   b2) deleting TIDs on said TID list based on said confirmed TID.

3. The method of claim 2, wherein
   said step a) stores said TIDs in chronological order in said TID list; and
   said step b2) deletes TIDs older than said confirmed TID from said TID list.

4. The method of claim 2, wherein
   said step a) stores said TIDs in chronological order in said TID list; and
   said step c) uses an oldest TID stored in said TID list in sending said transmission to said network.

5. The method of claim 2, wherein said step b1) confirms a TID when said TID is received in a transmission from said network.

6. The method of claim 1, wherein said step b) comprises:
   b1) determining a new TID; and
   b2) adding said new TID to said TID list.

7. The method of claim 6, wherein said step b) further comprises:
   b3) confirming a TID on said TID list; and
   b4) deleting TIDs on said TID list based on said confirmed TID.

8. The method of claim 7, wherein said step b3) confirms said new TID.

9. The method of claim 6, wherein said step b1) comprises:
   b11) receiving a first challenge from said network;
   b12) generating a second challenge; and
   b13) generating said new TID based on said first and second challenges.

10. The method of claim 9, wherein said step b) further comprises:
   b5) receiving a challenge response to said second challenge from said network; and
   said step b3) confirms said new TID if said challenge response is verified.

11. The method of claim 1, wherein
   said step a) stores said TIDs in chronological order in said TID list.

12. A method for managing use of a temporary mobile identifier (TID) at a network, comprising:
   a) storing at least one TID in a TID list for a mobile;
   b) modifying said TID list based on information received from said mobile; and
   c) using a TID on said TID list in sending a transmission to said mobile.

13. The method of claim 12, wherein said step b) comprises:
   b1) confirming a TID on said TID list based on said information received from said mobile; and
   b2) deleting TIDs on said TID list based on said confirmed TID.

14. The method of claim 13, wherein
   said step a) stores said TIDs in chronological order in said TID list; and
   said step b2) deletes TIDs older than said confirmed TID from said TID list.

15. The method of claim 13, wherein
   said step a) stores said TIDs in chronological order in said TID list; and said step c) uses a newest TID stored in said TID list in sending said transmission to said mobile.

16. The method of claim 13, wherein said step b1) confirms a TID when said TID is received in a transmission from said mobile.

17. The method of claim 12, wherein said step b) comprises:

b1) determining a new TID; and b2) adding said new TID to said TID list.

18. A method of determining a temporary mobile identifier (TID) at a mobile, comprising:

a) receiving a TID update request and a first challenge from a network;

b) generating a second challenge;

c) generating said TID based on said first and second challenges.

19. The method of claim 18, wherein said first and second challenges are random numbers.

20. The method of claim 18, further comprising:

d) performing a keyed cryptographic function on at least said first and second challenges to obtain a first challenge response;

e) sending said second challenge and said first challenge response to said network.

21. The method of claim 20, further comprising:

f) receiving a second challenge response from said network; and g) verifying said TID based on said second challenge response.

22. The method of claim 20, wherein said step (d) performs said keyed cryptographic function on said first challenge, said second challenge and type data, said type data indicating a type of protocol being performed by said network and said mobile.

23. A method of determining a temporary mobile identifier (TID) at a network, comprising:

a) sending a TID update request and a first challenge to a mobile;

b) receiving a second challenge from said mobile;

c) generating said TID based on said first and second challenges.

24. The method of claim 23, wherein said first and second challenges are random numbers.

25. The method of claim 23, further comprising:

d) receiving a first challenge response from said mobile, said first challenge response being a keyed cryptographic function performed on at least said first and second challenges to obtain a first challenge response;

e) verifying said mobile based on said first challenge response.

26. The method of claim 25, wherein said first challenge response is a keyed cryptographic function on said first challenge, said second challenge and type data, said type data indicating a type of protocol being performed by said network and said mobile.

* * * * *